United States Patent [19]
Kartzmark et al.

[11] 3,754,725
[45] Aug. 28, 1973

[54] AUXILIARY ROCKET APPARATUS FOR INSTALLATION ON A MISSILE TO IMPART A ROLL MOMENT THERETO

[75] Inventors: Roy M. Kartzmark, Duarte; John D. Skoog, Ridgecrest, both of Calif.

[73] Assignee: The United States of America as represented by the Secretary of the Navy, Washington, D.C.

[22] Filed: Apr. 30, 1968

[21] Appl. No.: 725,545

[52] U.S. Cl. ............................ 244/3.23, 102/49.5
[51] Int. Cl. ............................................. F42b 15/14
[58] Field of Search .................... 244/3.22, 3.23; 89/1.808; 102/49.4, 49.5, 34.3

[56] References Cited
UNITED STATES PATENTS

| | | | |
|---|---|---|---|
| 1,102,653 | 7/1914 | Goddard | 89/1.808 |
| 2,613,497 | 10/1952 | MacDonald | 60/229 |
| 2,968,245 | 1/1961 | Sutton et al. | 244/3.23 |
| 3,110,261 | 11/1963 | Walters et al. | 244/3.23 |
| 3,251,267 | 5/1966 | Hauser et al. | 244/3.23 X |

*Primary Examiner*—Verlin R. Pendegrass
*Attorney*—J. P. Dunlavey and E. F. Johnston

[57] ABSTRACT

An auxiliary rocket system for imparting a roll to a missile employing a unitary dual nozzled rocket motor. The dual nozzled rocket motor comprises a rocket tube containing a propellant grain of the type having internal burning surfaces, such as a central bore or the like, by which the propellant gases are communicated directly to both ends of the tube. Canted nozzles are affixed over the ends of the tube. The unitary dual nozzled rocket motor is mounted in a diametric disposition athwart the cylindrical body of the missile, with the canted nozzles directed in the same circumferential direction about the missile body.

2 Claims, 8 Drawing Figures

Patented Aug. 28, 1973

INVENTORS.
ROY M. KARTZMARK, JR
JOHN D. SKOOG
BY
MICHAEL F. OGLO
ROY MILLER
ATTORNEYS.

AUXILIARY ROCKET APPARATUS FOR INSTALLATION ON A MISSILE TO IMPART A ROLL MOMENT THERETO

The invention described herein may be manufactured and used by or for the Government of the United States of America for governmental purposes without the payment of any royalties thereon or therefor.

BACKGROUND OF THE INVENTION

This invention relates to improvements in auxiliary rocket motor apparatus for imparting a roll moment to a missile, which moment is superimposed in addition to the longitudinal thrust by a main propulsion rocket.

One of the basic methods for achieving an accurate predetermined ballistic trajectory with a rocket missile is the use of stabilizing fins. However, even where fins are used the missile is further subjected to trajectory dispersion errors caused by thrust and aerodynamic malalignment inherent to the tolerances of the components. A known technique for further improving the precision of trajectory of a fin stabilized rocket is to additionally cause the rocket to roll. The roll rate, which is considerably less than that involved in so-called "spin-stabilized" rockets, causes the effect of these malalignments to be self-cancelling and thereby reduces dispersion error.

As far as known, all prior art apparatuses for producing a roll moment have consisted of a complex of separate components. A plurality of nozzles are provided in equally angular spaced relationship around the missile body and the propellant gases are generated in a multiplicity of combustion chambers communicated with these nozzles through a complex of manifold passages. As a result, roll moment systems have heretofore been considered complex, expensive, and inefficient in utilization of space.

An object of this invention is to provide an improved rocket motor apparatus for producing a roll moment which is effective in reducing trajectory dispersion due to thrust and aerodynamic malalignment to negligible quantities and simple and inexpensive in construction.

Another object is to provide apparatus in accordance with the first object which is further of special utility in connection with a missile having a hinged airframe section which splits apart at its front end to separate the airframe from a front end payload.

Still another object is to provide rocket apparatus in accordance with the first objective which is "fail-safe" in its effect on the overall reliability of the missile.

Other objects and many of the attendant advantages of this invention will be readily appreciated as it becomes better understood by reference to the description and accompanying drawing which follows.

DESCRIPTION OF THE PREFERRED EMBODIMENT

Figure 1:
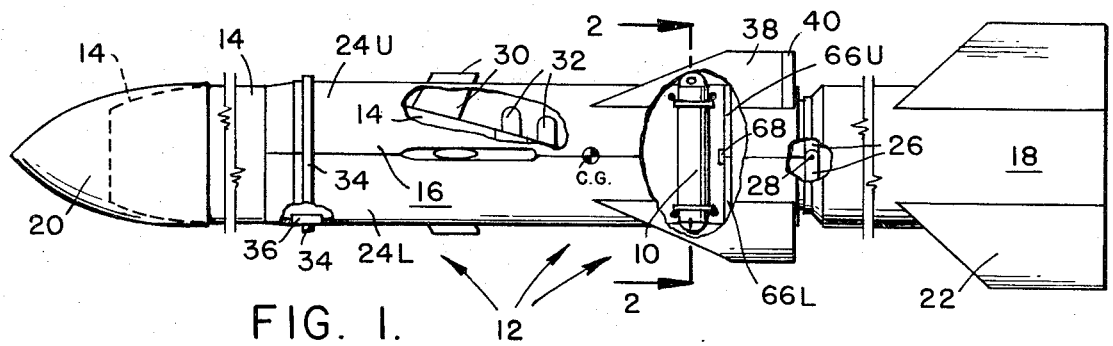
FIG. 1 is a view of a missile employing an auxiliary rocket motor for producing a roll moment, the view being a side elevation cutaway in several regions to show detail underneath the skin, the view also being foreshortened with large longitudinal sections of the actual missile configuration omitted.
Figure 2:
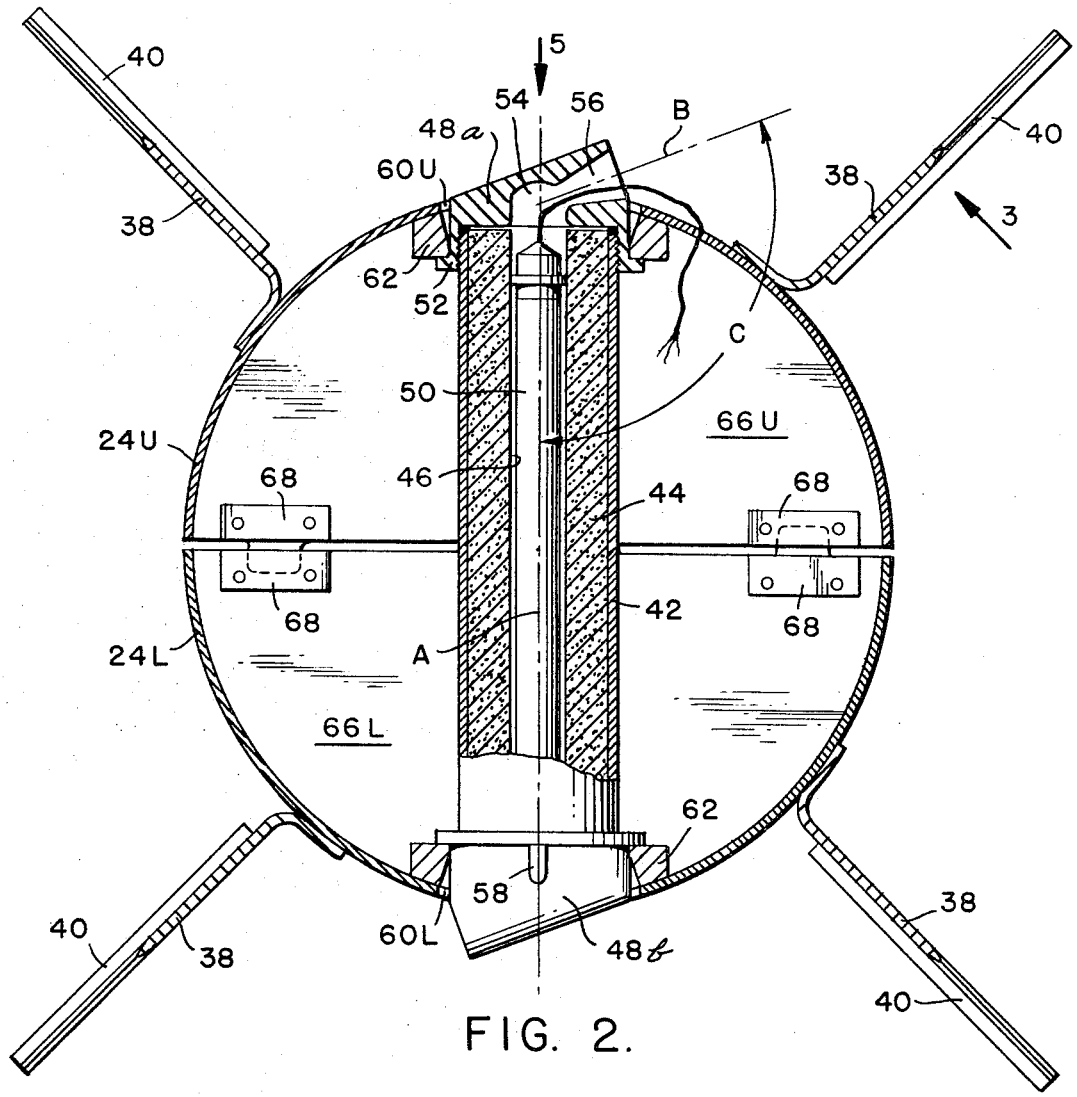
FIG. 2 is a section taken along line 2—2, FIG. 1.

Referring now to the drawing, and in particular to FIGS. 1 and 2, the subject of the invention is an auxiliary rocket motor 10 for use with a missile for producing roll moment. It is illustrated in the drawing installed in a composite antisubmarine missile 12. Rocket motor 10 has nozzles at both of its ends and extends through the body of the missile in a diametric disposition, with the nozzle projecting a slight distance above the skin of the missile. Composite missile 12 consists of a torpedo section 14, a hinged frame section 16, and a rocket motor section 18 and is basically the same as disclosed in the co-pending and commonly assigned application of Miles H. Hamilton entitled "Rocket Thrown Weapon," Ser. No. 15,769, filed Mar. 17, 1960. For convenience in illustration large longitudinal sections of torpedo 14 and rocket motor 18 are broken away in FIG. 1. (A full view of the configuration of the missile is illustrated in the co-pending application.) The rocket motor 10 is disposed slightly aft of the center of gravity (C.G.) of the composite missile.

An aerodynamic nosecap 20 is affixed to the front end of torpedo 14. Rocket motor 18 is the primary propulsion source for the missile, serving to impell it off a launcher and to propel it along a ballistic trajectory to the suspected situs of the submarine. The front end of rocket motor 18 is attached to the rear end of the hinged airframe section 16 by a piston and severable band jettison joint (not illustrated in detail). A control carried by the missile causes the joint to separate when the rocket motor has burned out, allowing the rocket motor to fall free while the airframe and torpedo proceed along the ballistic trajectory. In one operational embodiment, rocket motor 18 provides thrust for 6 seconds and is then jettison, and the torpedo and airframe proceeds along a ballistic trajectory for approximately another 54 seconds. A set of fins 22 are fixed to the end of the rocket motor.

Hinged airframe section is composed of an upper and lower semi-cylindrical shell members 24U, 24L, which are hinged at their rear end by a pair of semi-circular hinged plates 26, fastened by hinge pins 28. The front end of airframe section 16 encases the tailcone section of the torpedo 14. This is best shown in the cutaway of section 16 in FIG. 1 where the tail fins 30 and propellers 32 of torpedo 14 can be seen. The hinged semi-circular shells are fastened together by banding 34 at their front ends. An ejection spring arrangement (not shown) resiliently biases the front ends of shell members 24U and 24L to fly apart, so that the banding 34 fastens the shells together against spring loading. Thrust transfer lugs (not shown) are provided inside the airframe shells to transfer axial thrust forces between airframe section 16 and the torpedo. An explosive block 36 is disposed adjacent the banding 34. The missile carries a control which fires explosive block 36, to allow the hinge shells to separate and terminate the ballistic air flight trajectory at a desired range. See the cited co-pending application for further reference to details of the piston and severable band jettison joint, the hinged plates, the thrust transfer lugs, and the springs biasing the front end of the shells.

Figure 3:
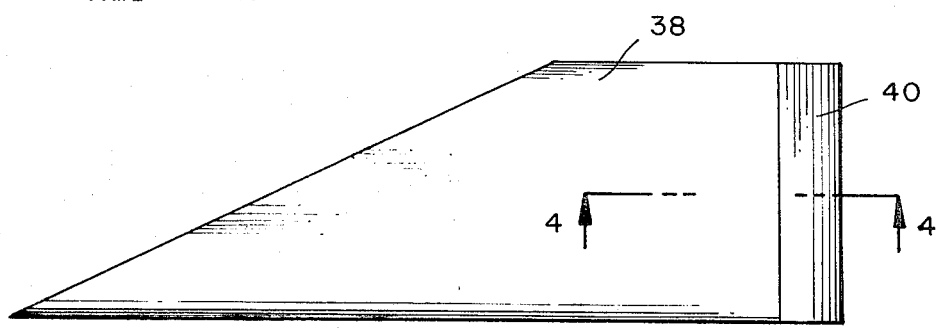
FIG. 3 is a side elevation of a fin structure of the missile as viewed along arrow 3, FIG. 2.
Figure 4:
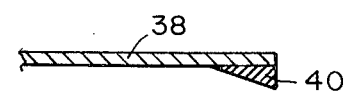
FIG. 4 is a section taken along lines 4—4, FIG. 3.

Another set of fins 38 are provided at the rear end of the airframe section to stabilize the torpedo and airframe after the motor is jettisoned. As best shown in FIGS. 3 and 4, taken in conjunction with FIG. 2, the clockwise faces (looking aft) of these fins are provided with small wedges 40 along the rear peripheral surface. Wedges 40 are constructed and arranged to provide aerodynamic roll forces in the counterclockwise direction during the ballistic airflight phase of the missile's travel.

Figure 5:
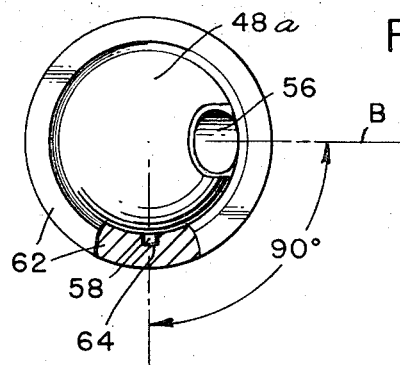
FIG. 5 is a detail showing the relation between a nozzle of the roll moment motor and a ring structure thereabout which is part of the mounting arrangement, the view effectively being a top elevation taken along arrow 5, but with the missile skin broken away.
Figure 6:
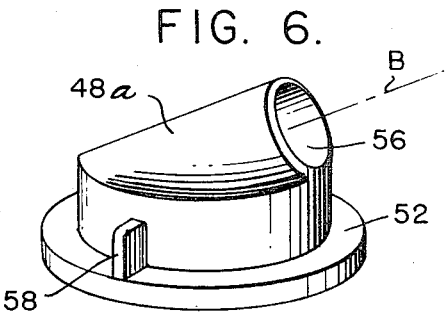
FIG. 6 is an isometric view of one of the nozzles of the roll moment motor.

Auxiliary rocket motor 10 comprises a motor tube 42 having an axis A, a propellant grain 44 having a central bore 46 extending between, or bonded to, the interior of the rocket motor, a pair of elbow nozzles 48a, 48b at each end, and an igniter 50 disposed in bore 46. Motor tube 42 has external threads formed on its exterior surface at each end. Rocket grain 44 is of the fast burning type which burns along its internal surfaces and is cast into, or bonded into, the rocket motor. Its burning time might typically be of the order of 0.2–0.3 seconds. It is to be understood that any other configuration of internal burning rocket grain which provides communication between the burning surfaces and the opposite ends of the rocket motor may be employed. Elbow nozzles 48 are provided with inwardly projecting skirts. The interior surface of the skirt is threaded for engagement with the threads on the ends of the rocket motor tube. A shoulder 52 is provided at the extreme inner end of the skirt. Each elbow nozzle has an inlet chamber 54 formed at its inner side and a convergent-divergent nozzle passage 56 extending generally laterally from the inlet chamber to the exterior of the nozzle. The axis B of convergent-divergent nozzle passage 56 is canted by a predetermined obtuse angle C from rocket motor axis A. As best shown in FIGS. 5 and 6, a key tab 58 is formed adjacent shoulder 52 of each elbow nozzle at an angular position 90° clockwise from the convergent-divergent nozzle passage.

Details of installation of unitary dual nozzles rocket 10 in hinged airframe section 16 will now be described. A pair of circular openings 60U, 60L are formed in upper shell member 24U and in lower shell 24L, respectively, in diametrically opposite positions. Abutment rings 62 are affixed to the inside surface of the shell members about the openings. When the shell members are fastened together, the diametrically aligned openings 60U and 60L in effect define a cylindrical diametric cavity 146 through the missile body for receiving the auxiliary rocket motor 10. Motor 10 is installed at the time the shell members are closed around the torpedo. As the shell members are swung shut, the abutment rings 62 slip down and around the lateral walls of the elbow nozzle, and in the closed position, the abutment ring seat against the shoulders 52 on the elbow nozzles. All the parts are so dimensioned that auxiliary rocket motor 10 is rigidly clamped between abutment rings 62 when shell members 24U, 24L are banded shut. The radially inward surface of the abutment rings 62 have a slight rake angle which allows the hinged shells to be opened and closed over the nozzle without binding. As shown in FIG. 5, each abutment ring 62 is provided with a keyway slot 64 aligned towards the aft end of the missile. Thus the airframe may be closed only if the elbow nozzles are aligned with their nozzle passage axis B accurately aligned in a circumferential clockwise direction.

The obtuse angle C at which nozzle passage axes B is canted is chosen to be just sufficient to direct the propellant gases clear of the adjacent fin structures 38, but with a maximum component of thrust force in a lateral direction to axis A. This results in a maximum roll moment about the missile axis when the rocket is fired. The airframe section is adapted to withstand the application of this moment by provision of a shear resisting structure just aft of the rocket motor. This structure consists of upper and lower semi-circular walls 66U, 66L welded in place in the shell member, and tongue-in-groove type shear blocks 68 which engage when the airframe is closed.

Figure 7:
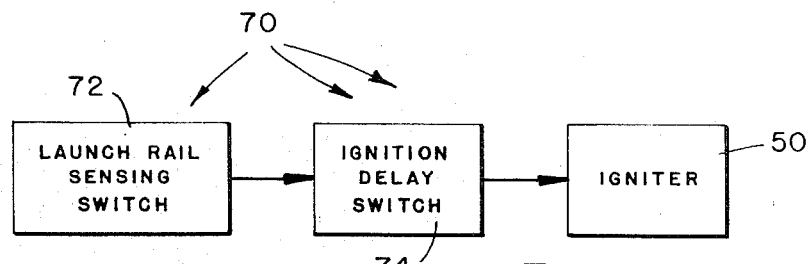
FIG. 7 is a block diagram of the ignition circuit for electrically initiating the roll moment motor.

Auxiliary rocket motor 10 is initiated at the beginning of the ballistic air flight very shortly after the missile leaves the launcher. Missile 12 is launched from a rail-type launcher such as disclosed in U. S. Pat. No. 3,106,132 entitled "Launcher," by B. Biermann and M. Appleman, FIG. 7 shows the ignition circuit 70 for electrically initiating roll motor 10 for such a launcher. This circuit consists of a launch rail sensing switch 72 carried by missile 12 which is adapted to close momentarily upon the missile leaving the launch rail. Switch 72 in turn actuates a delay switch 74 which closes after a delay of 0.3 seconds ensuring that the missile has moved a short distance from the launcher. Switch 74 in turn fires igniter 50 which initiates burning of grain 44.

Figure 8:
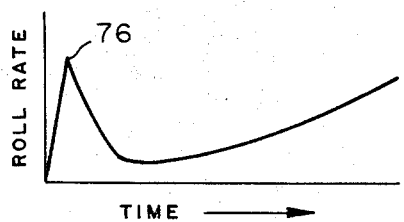
FIG. 8 is a graph depicting roll rate of the missile as a function of time, in accordance with the operation of the invention.

The operation of auxiliary rocket motor 10 in imparting a roll moment to missile 12 will now be described in connection with a graph of FIG. 8. Igniter 50 is fired after missile 12 leaves the launching rail and travels the distance determined by delay switch 74. Propulsion gases from the burning of rocket grain 44 produce a force couple or roll moment about the missile axis. This causes the missile roll rate to rise sharply to a maximum point 76, FIG. 8, just after the missile emerges from the launcher. When the rocket grain burns out, damping forces decrease the roll rate again, but as the missile velocity increases the aerodynamic forces caused by wedges 40 produce a gradual increase in roll rate. Missile roll is sustained by these aerodynamic forces during the period of burning of rocket motor 18 and during the remaining ballistic flight. When explosive block 36 is fired, upper and lower shells 24U, 24L, split and through an air brake action separate from the torpedo. The airframe shells typically fly apart shearing the hinge pins 28. Since auxiliary motor 10 was only held in place by clamping forces of the banding, it does not interfere with the separation (and therefore airbrake action) of the shells. The torpedo which is not subject to the airbrake action separates from the airframe but is "braked" by a drag parachute which opens after a predetermined delay. For further details of the airframe separation and parachute retarded drop of the torpedo, reference is made to the cited co-pending application.

It has been found that the roll moment impulse provided by rocket motor 10 acting in combination with aerodynamic forces caused by wedges 40 reduce the effects of thrust and aerodynamic malalignments to negligible quantities. This in turn appreciably reduces the dispersion error of the ballistic airflights of the missile.

An important feature of rocket motor 10 is that it is inherently "fail-safe" in its effect on the reliability of the missile. Inherently, it can produce only a thrust couple because the gases are communicated directly from the combustion chamber to both nozzles. Stated another way, it produces a thrust couple or no roll moment at all. If the auxiliary rocket motor fails to fire, the overall effect on the missile is only to increase the dispersion. Its mean impact point would be essentially unchanged.

Obviously many modifications and variations of the present invention are possible in the light of the above teachings. It is therefore to be understood that within the scope of the appended claims the invention may be practiced otherwise than as specifically described.

What is claimed is:

1. In a missile, the combination, comprising;
   a. a cylindrical missile body having an auxiliary rocket aperture extending diametrically therethrough,
   b. a rocket motor tube of a length approximately equal to the missile diameter disposed in said aperture,
   c. a longitudinal rocket grain disposed in said rocket motor tube, said grain being of the type having a longitudinal bore extending therethrough and adapted to burn along the interior of said bore so that propellant gases are communicated to both ends of the motor tube,
   d. first and second identical elbow nozzle units affixed over one and the other ends of the rocket motor tube, said identical elbow nozzle units each comprising a body member having formed therein an inlet chamber adjoining and in line with the adjacent end of the motor tube and having formed therin a convergent-divergent nozzle extending generally laterally through the wall of the body member from the inlet chamber to the exterior of the body member, and
   e. said elbow nozzle being affixed over the ends of the rocket motor tube with the axes of their convergent-divergent nozzles aligned in the same circumferential angular direction about the missile body.

2. A unitary dual nozzled rocket motor for producing a thrust couple about its midpoint, comprising;
   a. a rocket motor tube open at both of its ends,
   b. a longitudinal rocket grain disposed in said rocket motor tube, said grain being of the type having a longitudinal bore extending therethrough and adapted to burn along the interior of said bore so that propellant gases are communicated to both ends of the motor tube,
   c. first and second identical elbow nozzle units affixed over one and the other ends of the rocket motor tube, said identical elbow nozzle units each comprising a body member having formed therein an inlet chamber adjoining and in line with the adjacent end of the motor tube and having formed therein a convergent-divergent nozzle extending generally lateral through the wall of the body member from the inlet chamber to the exterior of the body member, and
   d. said elbow nozzle being affixed over the ends of the rocket motor tube with the axes of their convergent-divergent nozzles aligned in a central section through the axis of the rocket motor tube with the nozzle directed in one and the other of opposite lateral directions relative to the motor tube axis so that the rocket motor produces a balanced thrust coupled about the midpoint.

* * * * *